United States Patent [19]
Hoffman

[11] 3,805,165
[45] Apr. 16, 1974

[54] HETERODYNE AMPLIFIER CIRCUITS

[75] Inventor: Gary Robert Hoffman, Baltimore, Md.

[73] Assignee: The Bendix Corporation, Southfield, Mich.

[22] Filed: June 8, 1972

[21] Appl. No.: 260,871

[52] U.S. Cl. .................. 325/451, 343/5 PD, 343/8
[51] Int. Cl. ........................... H04b 1/28, G01s 9/44
[58] Field of Search ........ 343/5 PD; 325/18, 19, 20, 325/105, 451

[56] References Cited
UNITED STATES PATENTS
3,112,446  11/1963  Wilson .............................. 325/18 X
3,668,703  6/1972  Klein .............................. 343/5 PD
2,880,312  3/1959  Koch ................................. 325/451
2,989,745  6/1961  Carroll ............................ 325/19 X Primary Examiner—T. H. Tubbesing
Attorney, Agent, or Firm—W. G. Christoforo; Bruce L. Lamb

[57] ABSTRACT

A nonlinear transmitter final RF amplifier is used as a mixer circuit to obtain the difference frequency between the transmitter RF frequency and a received offset frequency. The use of this circuit in radar altimeters is shown.

1 Claim, 6 Drawing Figures

HETERODYNE AMPLIFIER CIRCUITS

BACKGROUND OF THE INVENTION

This invention relates to heterodyne amplifiers and more particularly to such amplifiers which use semiconductor elements as the active elements. The invention takes advantage of the nonlinearity of a transmitter final RF amplifier stage to permit the mixing of the transmitter RF frequency with a received offset frequency to produce a difference frequency. The circuits to be described are particularly adapted for use in doppler devices such as speed measuring radars and in FM continuous wave radars such as are used in aircraft altimeters.

It has been the practice in the past in the radar altimeter and radar speed measuring arts to use a separate mixer to provide a difference frequency between the instantaneously transmitted radio frequency and the received signal. Isolation means have been used at the antenna to separate the transmitted RF frequencies from the received RF frequencies.

In the present invention the nonlinearity of the semiconductor element comprising the final RF transmitter stage is used to mix the transmitted RF frequency with the received RF frequency. An idler circuit associated with the RF amplifier and tuned to the difference frequency enhances the difference frequency obtained. In addition, a simple low pass or band pass filter is used to provide the isolation between the transmitter and receiver portions of the circuit.

It is an object of this invention to provide a simple, solid state heterodyne amplifier.

It is another object of this invention to utilize the non-linear characteristics of a transmitter final RF amplifier to provide the mixing between the transmitted RF signal and a received offset signal to produce a difference frequency.

It is another object of this invention to provide simple, relatively inexpensive aircraft radar altimeters.

It is still a further object of this invention to provide a simple radar operating on doppler principles.

DESCRIPTION OF THE PREFERRED EMBODIMENT

Figure 1:
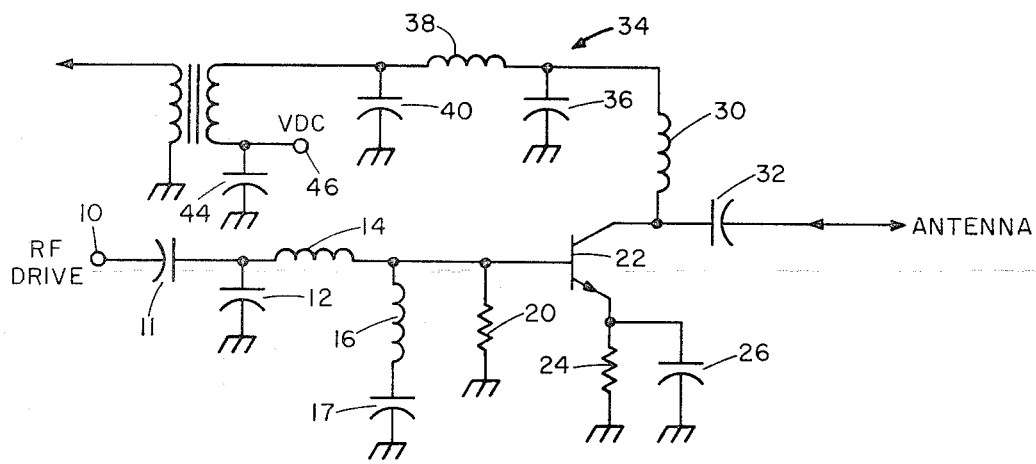
FIG. 1 is a common emitter circuit configuration of a heterodyne amplifier.

Refer first to FIG. 1 wherein there is seen a schematic of a heterodyne amplifier in a common emitter configuration. The RF drive frequency is applied to an input terminal 10 and is coupled through capacitor 11 and inductor 14 to the base electrode of an NPN transistor 22 which comprises the final RF amplifier stage. Capacitor 11 is a simple DC decoupling capacitor and together with inductor 14 and capacitor 12 which is connected between ground and the common terminal between capacitor 11 and inductor 14 form an RF impedance matching network. An idler circuit comprised of inductor 16 and capacitor 17 is serially connected between ground and the base electrode of transistor 22. These latter elements form an idler circuit which is tuned to the difference frequency to be described. The idler circuit is a short circuit to the difference frequencies and thus prevents loss of these frequencies. A resistor 20 connected between ground and the base electrode of transistor 22 is a simple DC return for the transistor base bias. The parallel arrangement of an emitter load resistor 24 and emitter bypass capacitor 26 are connected between the emitter electrode of transistor 22 and ground.

The amplifier output at the collector electrode of transistor 22 is connected through capacitor 32 to a suitable antenna (not shown). The collector electrode of transistor 22 is also connected through inductor 30 which together with capacitor 32 forms a load matching circuit, where in this embodiment the antenna comprises the load, and through a low pass filter 34 to one end of the primary winding of transformer 42. The other end of the primary winding is connected to the positive terminal 46 of a DC power supply (not shown). Terminal 46 is also connected through capacitor 44 to ground, where capacitor 44 operates as a bypass filter capacitor.

Low pass filter 34 is comprised of inductor 38 connected between transformer 42 and inductor 30 and shunt capacitors 36 and 40. This low pass filter is designed to pass the difference frequencies obtained by the mixing action of transistor 22 while greatly attenuating the transmitted RF frequencies and the received RF frequencies. In the applications for the circuits to be shown the difference frequency will be much less than the RF frequencies, hence the design for the low pass filter is relatively simple and common in the art.

The difference frequency is obtained from the secondary winding of transformer 42 and is supplied to a utilization device, generally the receiver circuit.

Of course, the RF amplifier comprised of transistor 22 must be nonlinear to obtain the mixing action required. The most common forms of RF amplifiers are normally nonlinear and hence readily adapted for use in this invention. Linear amplifiers are generally more difficult to design and more expensive to manufacture and are used only for special purposes. Of course, if a linear amplifier is used, the present invention is not applicable.

Figure 2:
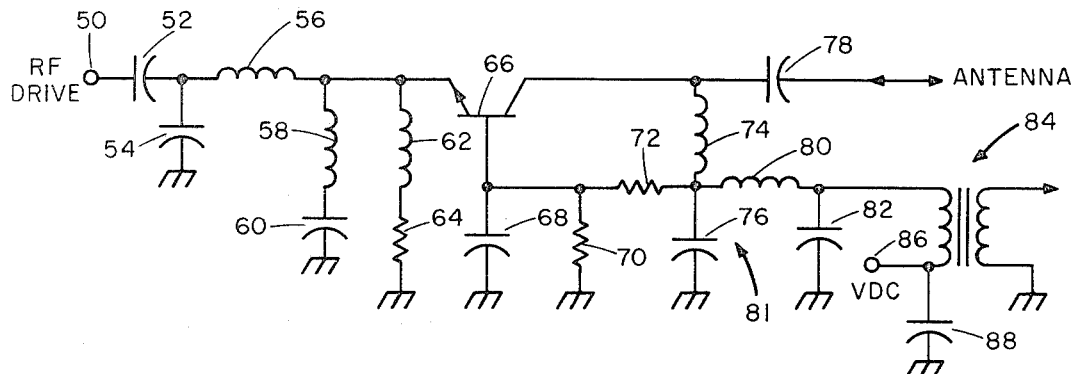
FIG. 2 is a common base circuit configuration of a heterodyne amplifier.

Refer now to FIG. 2 which is a schematic of a common base configuration of a heterodyne amplifier. In this circuit, the RF drive from the earlier stages appears at input terminal 50 and is coupled through capacitor 52 and inductor 56 to the emitter electrode of NPN transistor 66. Capacitor 52 provides DC decoupling and together with inductor 56 and capacitor 54 which is connected between the common junction of capacitor 52 and inductor 56 and ground comprise an RF impedance matching network. An idler circuit tuned to the difference frequency and comprised of inductor 58 and capacitor 60 is serially connected between the emitter electrode of transistor 66 and ground. The function of the idler circuit is the same as previously described with respect to FIG. 1. An emitter load is comprised of inductor 62 and resistor 64 serially connected between the transistor emitter electrode and ground.

The amplifier output appears at the transistor collector electrode which is connected through capacitor 78 to an antenna (not shown). Capacitor 78 together with inductor 74 having one end connected to the collector electrode of transistor 66 comprise a load or antenna matching network. The other end of inductor 74 is connected through resistor 72 to the base electrode of transistor 66. Resistor 72 together with resistor 70 which is connected between the base electrode and ground comprise the DC base bias resistors for the transistor. A base bypass capacitor 68 is connected between ground and the transistor base electrode. The transistor collector electrode is connected through inductor 74 to the low pass filter 81 comprised of inductor 80 and capacitors 76 and 82. The low pass filter 81 is tuned to pass the difference frequency and to attenuate the RF frequencies. The filter output is connected to the primary winding of transformer 84. The other end of the primary winding is connected at 86 to the positive terminal of a DC voltage source (not shown). The capacitor 88 connects the same terminal to ground and operates as a bypass line filter. As before, the difference frequency is obtained at the secondary winding of transformer 84.

Figure 3:
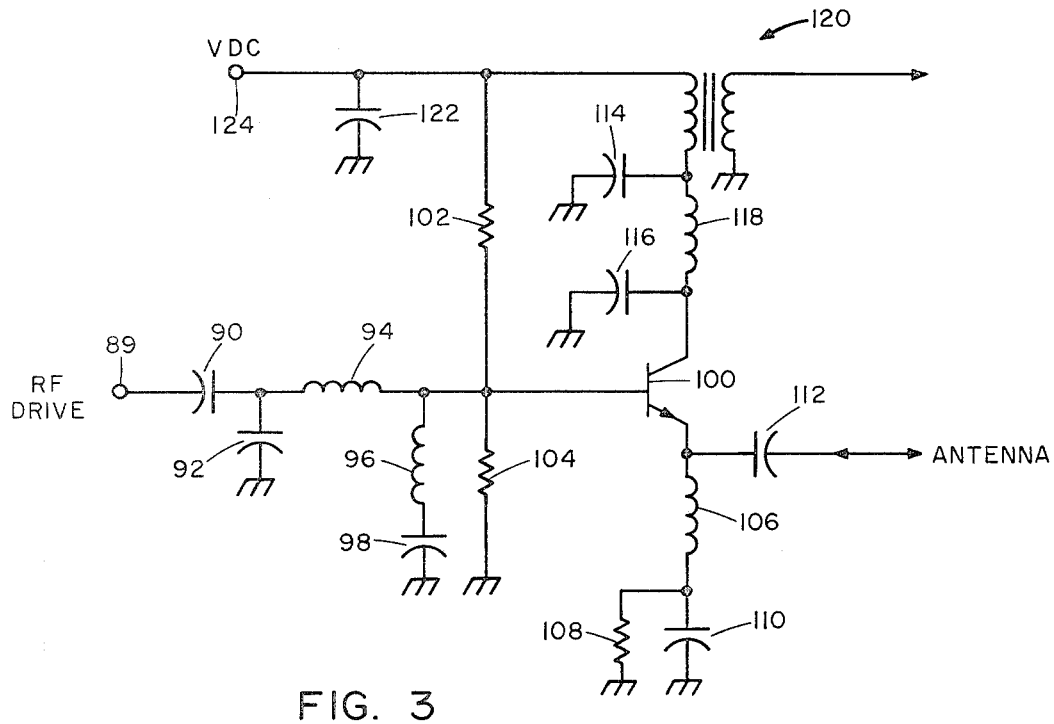
FIG. 3 is a complex circuit configuration of a heterodyne amplifier.

A complex circuit configuration of a heterodyne amplifier is shown in FIG. 3, reference to which should now be made. RF drive is applied at terminal 89 and connected through the isolation and matching network comprised of capacitors 90 and 92 and inductor 94 to the base electrode of NPN transistor 100. An idling circuit, as before, is connected between ground and the base electrode of transistor 100 and is comprised of inductor 96 and capacitor 98. The emitter electrode of transistor 100 is connected through capacitor 112 to an antenna (not shown). Capacitor 112 together with inductor 106, which has one end connected to the emitter electrode, comprise a load or antenna matching network. The other end of inductor 106 is connected to ground through the parallel arrangement of resistor 108 and capacitor 110. Transistor base bias voltage is supplied by the voltage divider comprised of resistors 102 and 104 connected between positive voltage terminal 124 and ground.

The mixed frequency products appear at the collector electrode of transistor 100. The low pass filter comprised of inductor 118 and capacitors 114 and 116 connect the collector electrode to the primary winding of transformer 120. As before, the difference frequency is obtained from the secondary winding of this transformer.

Figure 4:
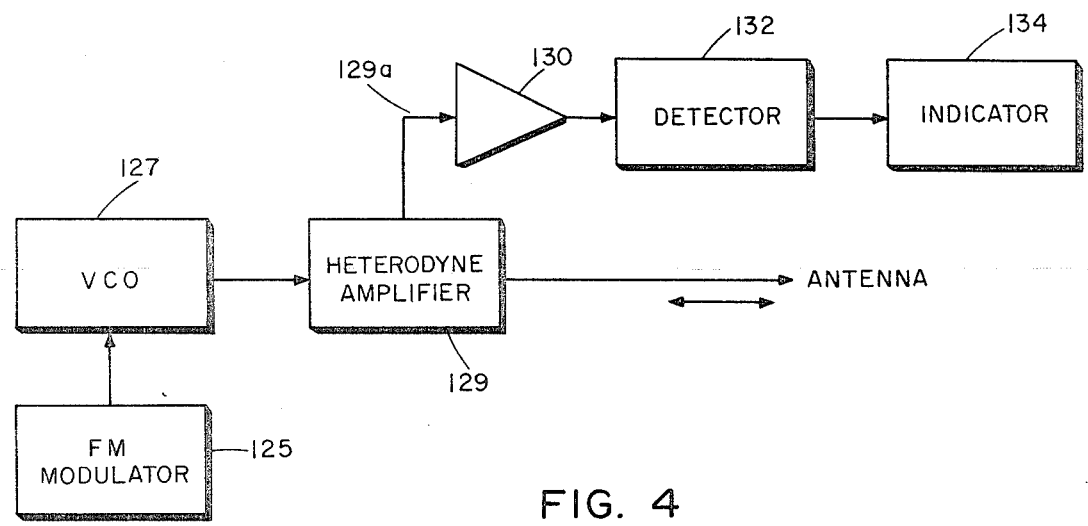
FIG. 4 is a block diagram of a radar altimeter making use of a heterodyne amplifier.

Refer now to the block diagram at FIG. 4. This figure illustrates a continuous wave FM modulated radar altimeter built in accordance with the principles of the invention. An FM modulator 125 modulates a voltage controlled oscillator 127 whose output is a radio frequency signal which is amplified and applied to the heterodyne amplifier 129, the output of which is radiated via an antenna (not shown). The signal reflected from the target, which in this case is the ground, is of a slightly different frequency than the instantaneous radio frequency being generated by the voltage controlled oscillator 127. The difference frequency which appears at line 129a is amplified by amplifier 130, detected by detector 132, the output of which is applied to indicator 134 which displays the aircraft altitude.

Figure 5:
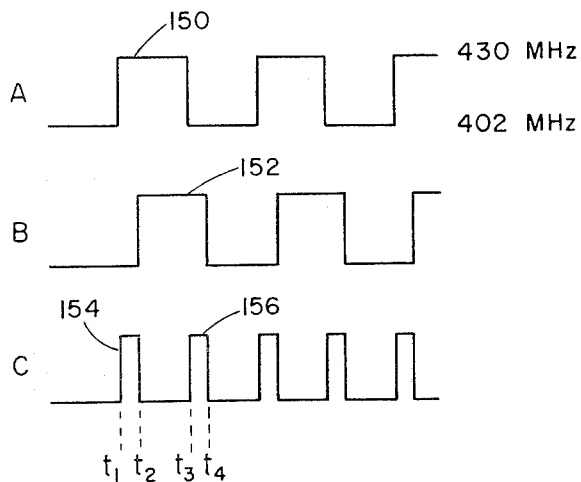
FIG. 5 is a graph that is useful in explaining the operation of one type of radar altimeter.

Referring now also to FIG. 5 it is assumed that the FM modulator 125 generates a square wave which is applied to the voltage controlled oscillator 127. The output of the oscillator will thus be radio frequency signals which are stepped between two radio frequencies. In this example, it is assumed that these radio frequencies are at 402 and 430 MHz, respectively. The heterodyne amplifier 129 will thus cause the antenna to alternately radiate these radio frequencies. These radiated frequencies are illustrated at line A of FIG. 5.

Assuming that frequencies at 430 MHz, as illustrated by pulse 150, are transmitted commencing at $t_1$, these signals will be reflected from the ground and returned to the antenna a short time thereafter, the time delay being determinative of aircraft altitude. In this example, the returned signals are received at $t_2$ and are illustrated at line B of FIG. 5 by pulse 152. Thus, between $t_1$ and $t_2$ a difference frequency will be generated at line 129a and is illustrated by pulse 154 at line C of FIG. 5 and which comprises the output from detector 132. Between $t_2$ and $t_3$, which is at the trailing edge of pulse 150, the transmitted and received frequencies are the same and hence there is no output on line 129a. However, at $t_3$ the transmitted frequency goes to 402 MHz while the received signal remains at 430 MHz. Hence, there is a difference frequency which appears at line 129a and which is illustrated by pulse 156 in FIG. 5. It should now be obvious that the width of the pulses at line C of FIG. 5, for example pulses 154 and 156, is a direct measure of the aircraft altitude. These pulses may now be integrated in a suitable indicator such as indicator 134 of FIG. 4 to provide a direct reading of aircraft altitude.

Figure 6:
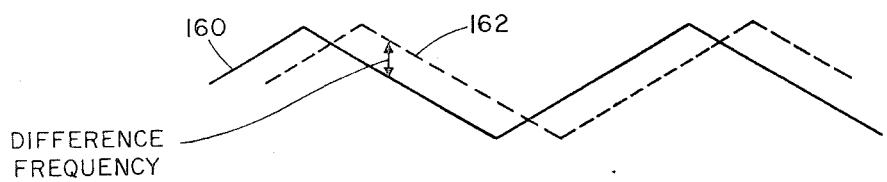
FIG. 6 is a graph that is useful in explaining the operation of another type of radar altimeter.

Assume now that the FM modulator 125 generates a sawtooth thus causing the voltage controlled oscillator 127 output frequency to alternately ramp upward and downward, as illustrated by curve 160 of FIG. 6. In this case, curve 160 also illustrates the frequencies being radiated by the antenna of FIG. 4. The returned frequencies, as illustrated by curve 162 of FIG. 6, lag the transmitted frequencies, the lag taking the form of a difference frequency which is a measure of aircraft altitude. In this case, indicator 134 is suitably simply a frequency meter calibrated in aircraft altitude.

The invention claimed is:

1. A heterodyne amplifier for amplifying radio frequency signals and for producing an enhanced difference frequency of said radio frequency signals and offset radio frequency signals, received from a remote location, comprising:

a source of said radio frequency signals comprising a voltage controlled oscillator;

means for generating a voltage signal which varies on a predetermined schedule, said voltage controlled oscillator being responsive to said voltage signal to vary said radio frequency signals on a predetermined schedule;

semiconductor means for providing nonlinear amplification of radio frequency signals applied thereto and simultaneous mixing of said radio frequency signals with offset radio frequency signals applied thereto;

bilateral transmission means for transmitting the radio frequency signals amplified by said semiconductor means and for simultaneously receiving from said remote location and applying said offset radio frequency signals to said semiconductor means;

utilization means responsive to the difference frequency of said radio frequency signals with said offset radio frequency signals; and, a low pass filter for communicating said difference frequency from said semiconductor means to said utilization means while attenuating said radio frequency signals; said semiconductor means including an idler circuit tuned to said difference frequency and connected into said semiconductor means for enhancing said difference frequency.

* * * * *